United States Patent
Judd et al.

(10) Patent No.: US 8,284,043 B2
(45) Date of Patent: Oct. 9, 2012

(54) METHOD OF FORMULATING RESPONSE TO EXPIRED TIMER FOR DATA LINK MESSAGE

(75) Inventors: Thomas D. Judd, Woodinville, WA (US); Thomas F. McGuffin, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 812 days.

(21) Appl. No.: 12/358,918

(22) Filed: Jan. 23, 2009

(65) Prior Publication Data

US 2010/0188266 A1 Jul. 29, 2010

(51) Int. Cl.
*G08B 26/00* (2006.01)
(52) U.S. Cl. ............... 340/505; 340/539.1; 340/539.13; 340/3.1; 340/6.1
(58) Field of Classification Search .......... 340/505, 340/539.1, 539.13, 3.1, 6.1
See application file for complete search history.

(56) References Cited

U.S. PATENT DOCUMENTS

| | | | |
|---|---|---|---|
| 5,003,619 A | 3/1991 | Morris et al. | |
| 6,085,145 A | 7/2000 | Taka et al. | |
| 6,175,314 B1 | 1/2001 | Cobley | |
| 6,181,260 B1 | 1/2001 | Simon et al. | |
| 6,195,609 B1 | 2/2001 | Pilley et al. | |
| 6,282,417 B1 | 8/2001 | Ward | |
| 6,313,759 B1 | 11/2001 | Musland-Sipper | |
| 6,608,559 B1* | 8/2003 | Lemelson et al. | 340/539.13 |
| 2003/0006910 A1 | 1/2003 | Dame | |
| 2003/0153263 A1 | 8/2003 | Glass | |
| 2004/0124998 A1 | 7/2004 | Dame | |
| 2004/0132452 A1 | 7/2004 | Lee | |
| 2008/0114504 A1 | 5/2008 | Goodman et al. | |
| 2008/0154486 A1 | 6/2008 | Coulmeau | |
| 2008/0163093 A1 | 7/2008 | Lorido | |
| 2008/0316057 A1 | 12/2008 | McGuffin | |
| 2010/0277292 A1 | 11/2010 | McGuffin et al. | |

(Continued)

FOREIGN PATENT DOCUMENTS

EP 2012493 1/2009

(Continued)

OTHER PUBLICATIONS

Eurocontrol, "Cascade Applications—Information Paper", Nov. 3, 2004, pp. 1-15, Publisher: Aeronautical Communications Panel (ACP)—Working Group N (Networking), Published in: New Orleans, US.

(Continued)

*Primary Examiner* — Daryl Pope
(74) *Attorney, Agent, or Firm* — Fogg & Powers LLC

(57) ABSTRACT

A method for communicating a data link message is provided. The method comprises transmitting a data link message from a sender to a receiver, storing the transmitted data link message, and starting a message timer when the data link message is transmitted. The method further comprises determining whether a response to the data link message has been received, and determining whether the message timer has expired if the response has not been received. The sender is notified when the message timer has expired and the response has not been received. Input is requested from the sender whether or not to retransmit the data link message. If input is received from the sender to retransmit, the data link message is displayed to the sender for review and edit. The data link message is then retransmitted from the sender to the receiver.

20 Claims, 4 Drawing Sheets

U.S. PATENT DOCUMENTS

2010/0277347 A1 11/2010 Judd

FOREIGN PATENT DOCUMENTS

WO 2006087276 8/2006
WO 2007064734 6/2007

OTHER PUBLICATIONS

Asbury, M.J.A., "Integration of ADS and CPDLC in the NAT Region—Integrated Scenarios", "Aeronautical Telecommunications Network Panel, Working Group 3 Meeting", Mar. 4, 1997, Published in: Phuket, Thailand.

"Interoperability Requirements Standard for Aeronautical Telecommunication Network Baseline 1 (ATN B1 Interop Standard)", Jun. 26, 2007, pp. 102-107, vol. 1, Publisher: RTCA, Incorporated, Published in: Washington, DC.

U.S. Patent and Trademark Office, "Advisory Action", "U.S. Appl. No. 11/765,157", Feb. 15, 2011.

European Patent Office, "Office Action" of foreign counterpart of U.S. Appl. No. 12/434,763, Jul. 22, 2010, Published in: EP.

European Patent Office, "European Search Report" of foreign counterpart of U.S. Appl. No. 12/686,708, mailed Apr. 6, 2011, Published in: EP.

U.S. Patent and Trademark Office, "Final Office Action", "U.S. Appl. No. 11/765,157", Nov. 29, 2010.

U.S. Patent and Trademark Office, "Office Action", "U.S. Appl. No. 12/434,763", May 25, 2012.

U.S. Patent and Trademark Office, "Office Action", "U.S. Appl. No. 12/434,763", Sep. 30, 2011.

U.S. Patent and Trademark Office, "Office Action", "U.S. Appl. No. 11/765,157", May 19, 2010.

U.S. Patent and Trademark Office, "Office Action", "U.S. Appl. No. 11/765,157", Nov. 25, 2011.

U.S. Patent and Trademark Office, "Office Action", "U.S. Appl. No. 12/686,708", May 24, 2012.

European Patent Office, "Office Action" of foreign counterpart of U.S. Appl. No. 11/765,157, Apr. 29, 2009, Published in: EP.

European Patent Office, "European Search Report" of foreign counterpart of U.S. Appl. No. 12/434,763, mailed Jul. 8, 2010, Published in: EP.

European Patent Office, "Office Action" of foreign counterpart of U.S. Appl. No. 12/686,708, Apr. 13, 2011, Published in: EP.

U.S. Patent and Trademark Office, "Final Office Action", "U.S. Appl. No. 11/765,157", Jul. 6, 2012.

European Patent Office, "European Search Report" of foreign counterpart of U.S. Appl. No. 11/765,157, mailed Feb. 19, 2009, Published in: EP.

\* cited by examiner

METHOD OF FORMULATING RESPONSE TO EXPIRED TIMER FOR DATA LINK MESSAGE

BACKGROUND

Air traffic control (ATC) centers are used at most airports to coordinate take-offs, landings, and general aircraft traffic around the airport. Traditionally, a pilot uses a radio to speak to an ATC center to request permission or to receive instructions from the ATC center. With increasing air traffic, it has become difficult for ATC centers and pilots to process all of the oral communications with aircraft without error. Consequently, data link applications have been developed to provide textual communications between pilots and air traffic controllers.

One of these data-link applications, called Controller Pilot Data Link Communication (CPDLC), provides for the direct exchange of text-based messages between a controller and a pilot. The CPDLC application enables the pilot to communicate electronically with an ATC center by guiding the pilot through a series of screen configurations or displays that either elicit flight information from the pilot or notify the pilot regarding flight information. The CPDLC application may be part of a larger flight information/control program or may serve as a stand-alone program.

In current CPDLC systems, when the TTS (Termination Timer, Sender) timer expires for a CPDLC clearance downlink request message, the pilot is informed of the expiration. For example, in a conventional communication management unit (CMU) the status of the message in a message log is changed to EXPIRED. In one implementation, as the status changes, the pilot is given a sidelink message indicating the downlink has expired and that the pilot should resend the request. Upon notification, the pilot will likely want to resend the clearance request and maybe modify the request. However, the pilot has to remember what the previous message stated, or print out the previous message, and then manually re-enter the entire message before resending the message. This substantially increases the aircraft crew workload and head down time, which adds to pilot fatigue and distraction while operating the aircraft. This equally applies to the air traffic controller.

SUMMARY

The present invention relates to a method for communicating a data link message, including a method of formulating a response to an expired message timer for a data link message. The method comprises transmitting a data link message from a sender to a receiver, storing the trasmitted data link message, and starting a message timer when the data link message is transmitted. The method further comprises determining whether a response to the data link message has been received, and determining whether the message timer has expired if the response has not been received. The sender is notified when the message timer has expired and the response has not been received. Input is requested from the sender whether or not to retransmit the data link message. If input is received from the sender to retransmit, the data link message is displayed to the sender for review and edit. The data link message is then retransmitted from the sender to the receiver.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
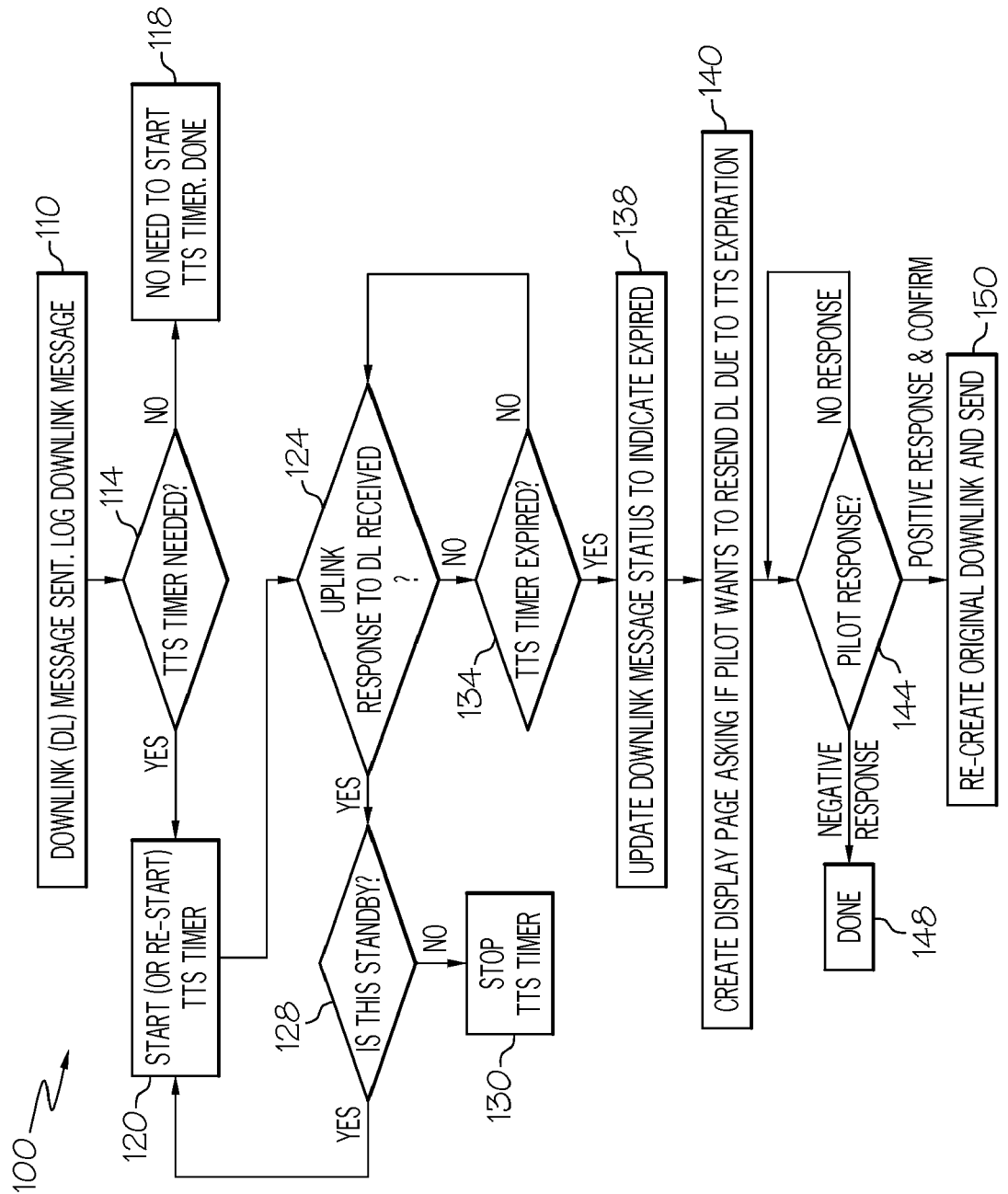
FIG. 1 is a flow diagram representing a method of formulating a response to an expired Termination Timer, Sender (TTS) timer for a data link message according one approach of the present invention.

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention is directed to a method of formulating a response to an expired message timer for a data link message, such as an expired Termination Timer, Sender (TTS) message timer for a Controller Pilot Data Link Communication (CPDLC) message. The present method provides the advantage of reducing aircraft crew workload and minimizing pilot head down time, as well as reducing air traffic controller workload.

In one approach of the present method, a data link message is tranmitted from a sender to a receiver, the transmitted data link message is stored, and a message timer is started. Thereafter, a determination is made whether a response to the data link message has been received, and if not, a determination is made whether the message timer has expired. The sender is notified when the message timer has expired with no response message received, and a determination is then made whether the sender wants to retransmit the data link message. If the the sender decides to retransmit the data link message, the original data link message is shown to the sender prior to retransmittal of the data link message. The sender can edit the original data link message, if desired, prior to retransmittal.

The present method can be implemented in a communication management function (CMF) of a communication management unit (CMU); in a flight management computer (FMC) such as an FMC hosting CPDLC applications; or in any other avionics computer in an aircraft. The present method can also be implemented as part of the CPDLC software in an air traffic control computer. In addition, the present method can be a part of the communication protocols for future air navigation system (FANS) CPDLC systems, or aeronautical telecommunication network (ATN) CPDLC systems.

Current CMF, CMU, and FMC systems supporting CPDLC (both FANS and ATN versions) have a sidelink or communication system alert type message. In implementing the present method, the existing sidelink can be enhanced to prompt a flight crew if they want to re-send the expired message, or a new sidelink can be added to perform this function. The term "sidelink" as used herein refers to a message sent automatically from the avionics or ATC system to the user such as a pilot or air traffic controller as opposed to an uplink or downlink (but may be treated very similarly as an uplink or downlink).

When the present method is implemented in an aircraft avionics computer, the pilot is prompted on a display screen by notification about the data link message expiration to see if the pilot would like to resend the downlink. For example, the data link message can be a CPDLC ATC downlink clearance request that is monitored by a TTS timer. If the pilot indicates that he/she would like to re-send the message, then the pilot is redirected to a page on the display screen where the message can be reviewed, edited, and sent again. In this approach, the pilot does not have to go back and figure out what the old message was, re-enter the information, and then send the message again as in conventional methods. The present method may also be implemented in an air traffic control computer to similar effect on the air traffic controller side as well.

The TTS timer used in the present approach is described in further detail in *Interoperability Requirements Standard for Aeronautical Telecommunication Network Baseline* 1, RTCA, Inc., vol. 1, sec. 4.2.1, pp. 102-107 (2007), which is incorporated by reference herein.

In another embodiment, the present method can be implemented using voice readback/recognition software or supplemented with voice readback/recognition software. For example, the sidelink can be replaced or supplemented with a voice readback function, and button pushes can be replaced by voice commands.

The present method can be implemented for an aircraft by modifying conventional avionics software to add appropriate logic steps to perform the method. The present method can be implemented for an air traffic control system on the ground by modifying the air traffic controller workstation software to add logic steps to perform the method. It should be understood that the avionics and ground implementations of the present method utilize the same unique features but are independent of each other. Thus, the present method can function even if only one of the aircraft or the air traffic control system has been implemented with software for performing the method.

The method of the present invention is described in further detail as follows with reference to the drawings.

FIG. 1 is a flow diagram representing a method 100 of formulating a response to an expired TTS timer for a data link message according one approach of the present invention. Although method 100 is described with respect to messages sent from a pilot to an ATC ground station, the method can be applied in the same way to messages sent to a pilot from the ground station.

The method 100 starts when a downlink (DL) message is sent, such as a CPDLC message sent from a pilot, and the downlink messeage is saved in a message log (block 110). The message log stores various uplink, downlink, and sidelink messages for later use by the pilot. A determination is then made whether a TTS timer is needed (block 114). If not, then the TTS timer is not started and method 100 is done (block 118). If the TTS timer is needed, then the TTS timer is started or restarted (block 120).

A determination is then made whether an uplink response to the downlink message has been received (block 124). If yes, then a query is made whether the uplink response is a standby message (block 128). If the uplink response is a standby message, then the method returns to block 120 and the TTS timer is started (or restarted). If the uplink response is not a standby message, the TTS timer is stopped (block 130).

Referring again to block 124, if an uplink response to the downlink message has not been received, then a query is made whether the TTS timer has expired (block 134). If the TTS timer has not expired, then the method returns to block 124. If the TTS timer has expired at block 134, then a downlink message status is updated to indicate the TTS timer has expired (block 138). A first display page is then created that shows the downlink message and queries whether the pilot wants to resend the downlink message due to the TTS timer expiration (block 140).

determination is then made whether the pilot has given a response to the query (block 144). If no response is given, the query at block 144 is repeated. If the pilot gives a negative response to the query at block 140, method 100 is done and terminated (block 148). If the pilot gives a positive response to the query at block 140 and confirms, the original downlink message is recreated on a second display page for review by the pilot (block 150). The pilot can edit the message prior to resending if desired.

Figure 2:
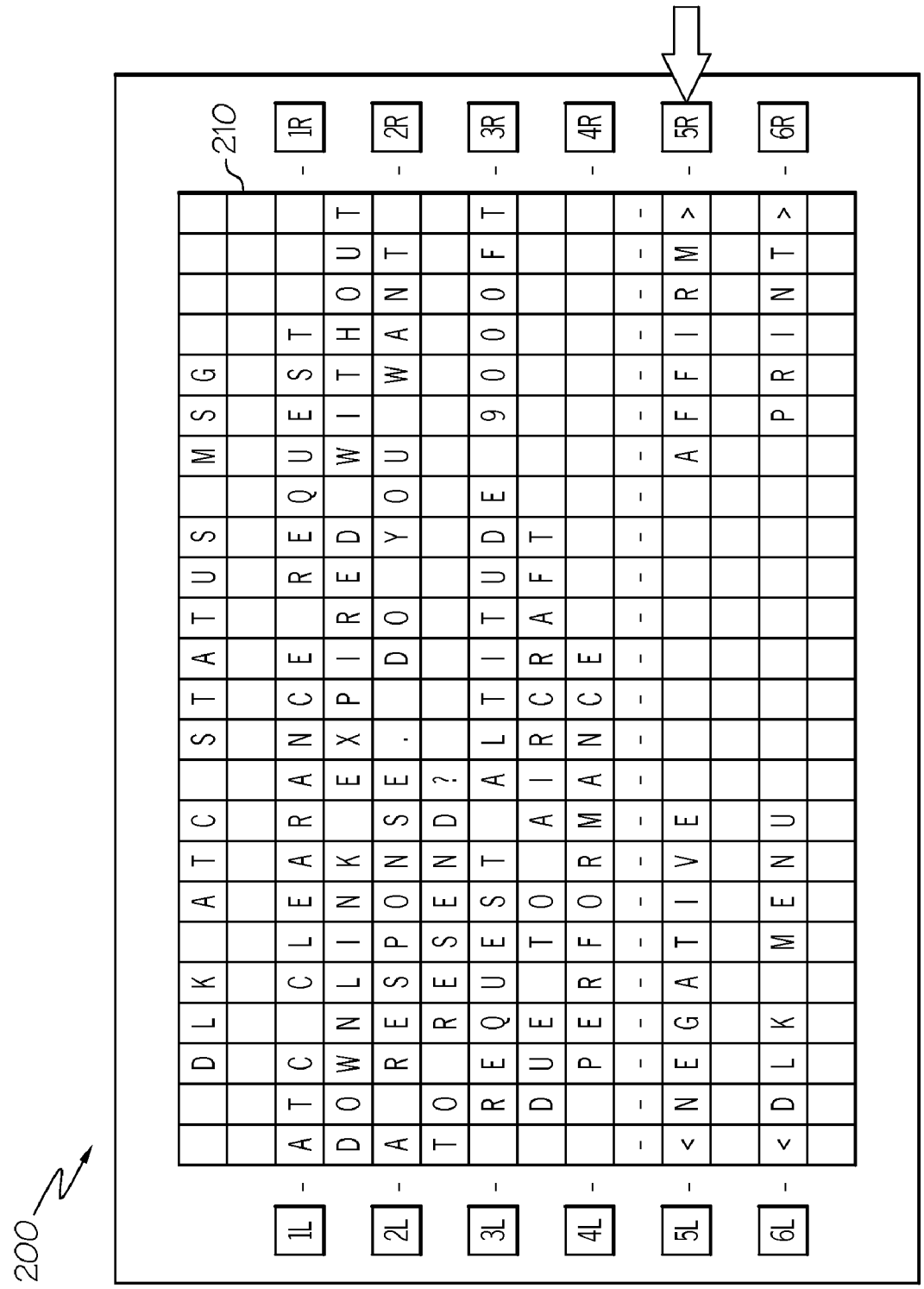
FIG. 2 depicts a pilot display device showing an exemplary sidelink or communication system alert page for a data link message that is displayed when the TTS timer has expired during operation of the method of the invention.

FIG. 2 depicts a pilot display device 200, showing an exemplary sidelink page for a data link message that is displayed on a screen 210 when the TTS timer has expired during operation of the present method, according to one implementation. In one embodiment, the display device 200 has manual buttons 1L to 6L on the left side of screen 210, and manual buttons 1R to 6R on the right side of screen 210.

The display device 200 can be implemented as part of a Human-Machine Interface (HMI) device, such as those currently used by pilots in the cock-pits of various aircraft. Examples of such HMI devices include a Multi-Control Display Unit (MCDU), and a Multi Function Display (MFD) system.

The display device 200 shows the data link (DLK) ATC Status Message (MSG):

ATC CLEARANCE REQUEST
DOWNLINK EXPIRED WITHOUT A RESPONSE. DO YOU WANT TO RESEND?

The display device 200 also shows the message that was previously sent, which in this case states:

REQUEST ALTITUDE 9000 FT DUE TO AIRCRAFT PERFORMANCE

Figure 3:
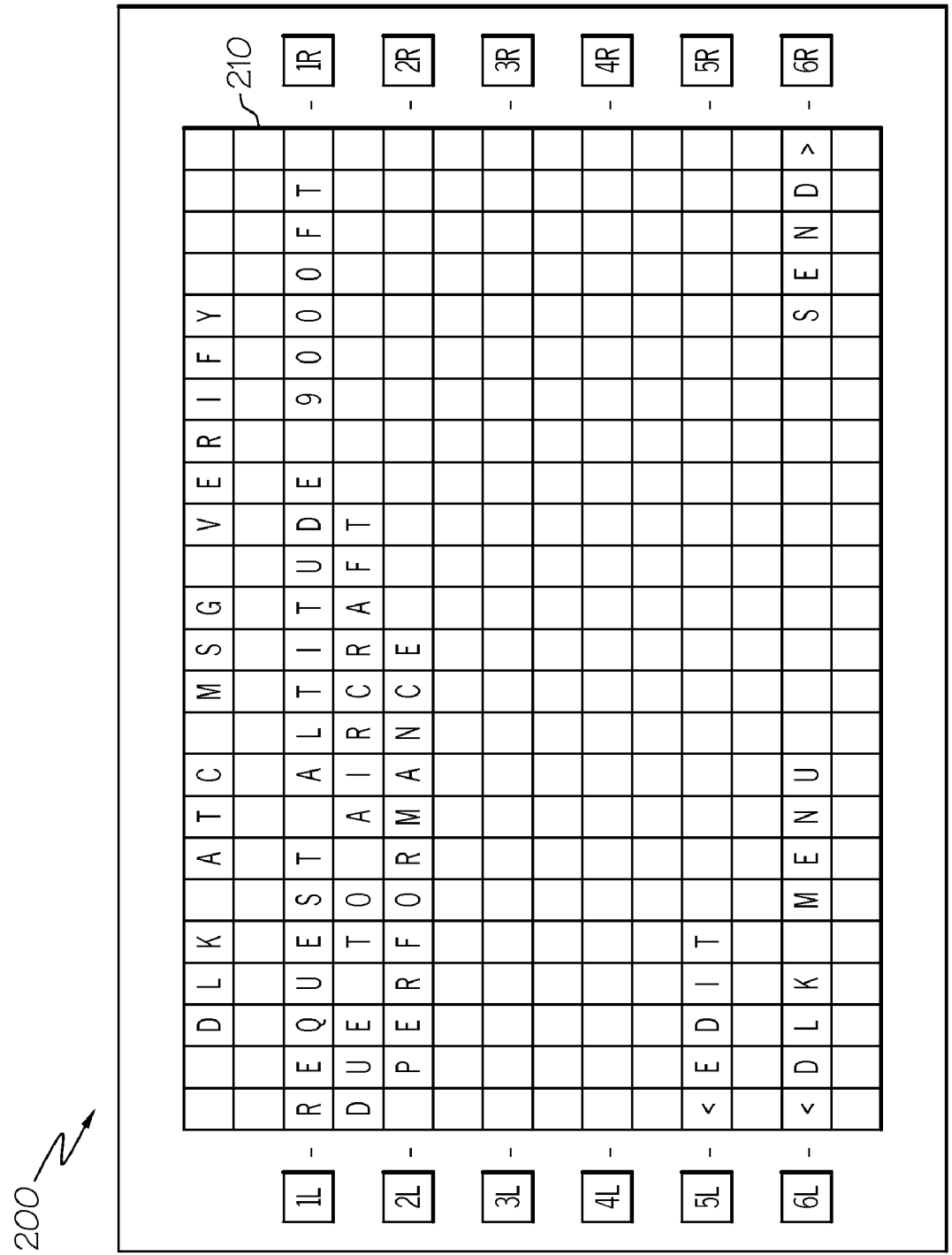
FIG. 3 depicts the pilot display device of FIG. 2, showing an exemplary Verify page for a data link message that is to be resent during operation of the method of the invention.

The pilot can respond by pushing the appropriate button corresponding to various selections, including NEGATIVE (5L), AFFIRM (5R), DLK MENU (6L), or PRINT (6R). When the AFFIRM button is selected, screen 210 displays a Verify page for the data link ATC message to be resent, as depicted in FIG. 3. The Verify page displays the original downlink message for review by the pilot:

REQUEST ALTITUDE 9000 FT DUE TO AIRCRAFT PERFORMANCE

The Verify page allows the pilot to select various functions, including EDIT (5L), SEND (6R), and DLK MENU (6L), by pushing the appropriate button. This allows the pilot to resend the original message again without having to re-enter the downlink message information. The pilot can also edit the original message at the Verify page prior to resending the message.

It should be understood that the present method can be used for a wide variety of different types of data link messages utilized during flight of an aircraft.

Figure 4:
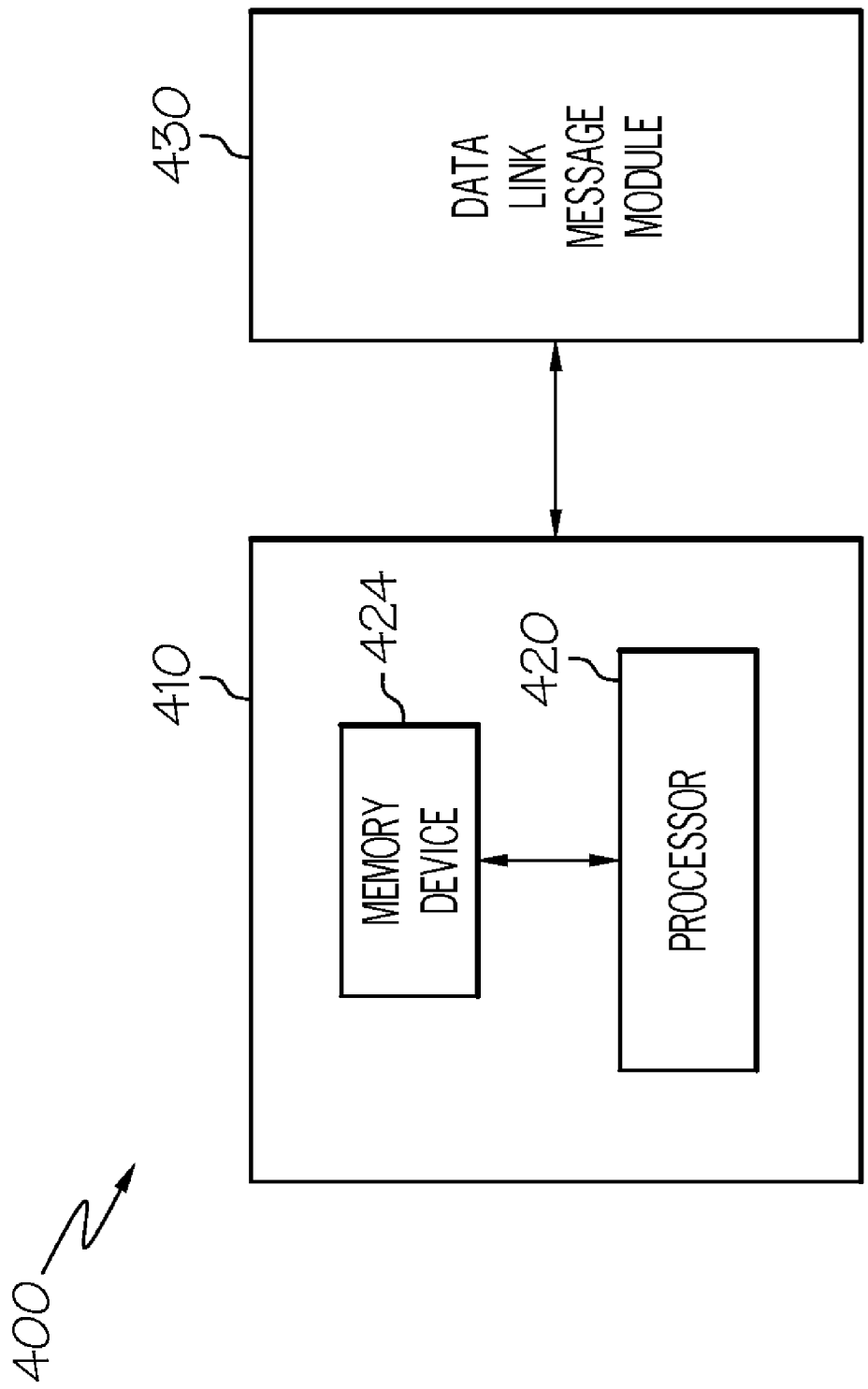
FIG. 4 is a block diagram of a computer system that can implement the method of the invention.

FIG. 4 is a block diagram of a computer system 400 that can implement the present method. The computer system 400 can be implemented as a flight communications management unit, a flight management computer, or an air traffic control computer. The computer system 400 comprises a processing and storage platform 410, which includes at least one processor 420 and at least one memory device 424 in operative communication with processor 420. The computer system 400 can also incorporate a data link message module 430, such as a CPDLC application module, to enable transmission and reception of data link messages. The data link message module 430 is in operative communication with processor 420 and memory device 424.

The processor 420 can be implemented using software, firmware, hardware, or any appropriate combination thereof, as known to one of skill in the art. By way of example and not limitation, hardware components for processor 420 can include one or more microprocessors, memory elements, digital signal processing (DSP) elements, interface cards, and other standard components known in the art. Any of the foregoing may be supplemented by, or incorporated in, specially-designed application-specific integrated circuits (ASICs) or field programmable gate arrays (FPGAs). In this exemplary embodiment, processor 420 includes or functions with software programs, firmware, or other computer readable instructions for carrying out various process tasks, calculations, and control functions, used in the present method. These instructions are typically tangibly embodied on any appropriate medium used for storage of computer readable instructions or data structures.

The memory device 424 can be implemented with any available computer readable storage media that can be accessed by a general purpose or special purpose computer or processor, or any programmable logic device. Suitable computer readable media may include storage or memory media such as magnetic or optical media. For example, storage or memory media may include conventional hard disks, Compact Disk-Read Only Memory (CD-ROM), DVDs, volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), and the like), Read Only Memory (ROM), Electrically Erasable Programmable ROM (EEPROM), flash memory, and the like. Suitable processor-readable media may also include transmission media such as electrical, electromagnetic, or digital signals, conveyed via a communication medium such as a network and/or a wireless link. Combinations of the above are also included within the scope of computer readable media.

The method of the invention can be implemented in computer readable instructions, such as program modules or applications, which are executed by a data processor. Generally, program modules or applications include routines, programs, objects, data components, data structures, algorithms, and the like, which perform particular tasks or implement particular abstract data types. These represent examples of program code means for executing steps of the methods disclosed herein. The particular sequence of such executable instructions or associated data structures represent examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for communicating a data link message, the method comprising:

transmitting a data link message from a sender to a receiver;

storing the trasmitted data link message;

starting a message timer when the data link message is transmitted;

determining whether a response to the data link message has been received;

determining whether the message timer has expired if the response has not been received;

notifying the sender when the message timer has expired and the response has not been received;

requesting input from the sender whether or not to retransmit the data link message;

if input is received from the sender to retransmit the data link message, displaying the data link message to the sender for review and edit; and retransmitting the data link message from the sender to the receiver.

2. The method of claim 1, wherein the sender is a pilot in an aircraft, or an air traffic controller.

3. The method of claim 1, wherein the receiver is an air traffic controller, or a pilot in an aircraft.

4. The method of claim 1, wherein the method is implemented as part of communication protocols for a future air navigation controller pilot data link communication (CPDLC) system.

5. The method of claim 1, wherein the method is implemented as part of communication protocols for an aeronautical telecommunication network CPDLC system.

6. The method of claim 1, wherein the data link message comprises a CPDLC message.

7. The method of claim 1, wherein the message timer comprises a termination timer, sender (TTS) timer.

8. The method of claim 1, wherein requesting input from the sender whether or not to retransmit the data link message comprises:

creating a display page on a screen that shows the transmitted data link message to the sender, and asks whether the sender wants to resend the data link message.

9. The method of claim 8, wherein the screen is implemented in a human-machine interface device.

10. A method of formulating a response to an expired message timer for a data link message, the method comprising:

(a) storing a trasmitted data link message;

(b) determining whether a message timer is needed;

(c) starting the message timer when the message timer is needed;

(d) determining whether a response to the data link message has been received;

(e) if the response has been received, determining whether the response is a standby message;

(i) if the response is a standby message, repeating the method starting at step (c); and (ii) if the response is not a standby message, stopping the message timer;

(f) if the response has not been received, determining whether the message timer has expired;

(g) if the message timer has not expired, repeating the method starting at step (d);

(h) updating a data link message status when the message timer has expired to indicate expiration of the message timer;

(i) creating a first display page that shows the data link message and queries whether to resend the data link message due to the message timer expiration; and (j) determining whether there is a response to the query on the first display page;
  (i) if no response to the query is received, repeating step (j);
  (ii) if there is a negative response to the query, terminating the method;
  (iii) if there is a positive response to the query, creating a second display page that shows the data link message for review and edit prior to resending the data link message.

11. The method of claim 10, wherein the data link message comprises a CPDLC message.

12. The method of claim 10, wherein the message timer comprises a TTS timer.

13. The method of claim 10, wherein the first and second display pages are shown by a human-machine interface device.

14. A computer system, comprising:
at least one processor; and
at least one memory device in operative communication with the processor, the memory device comprising a computer readable medium having program instructions stored thereon for a method of formulating a response to an expired message timer for a data link message according to claim 10.

15. The computer system of claim 14, wherein the computer system comprises a communication management unit, a flight management computer, or an air traffic control computer.

16. The computer system of claim 14, further comprising a data link message module in operative communication with the processor and the memory device.

17. The computer system of claim 16, wherein the data link message module comprises a controller pilot data link communication application.

18. A computer program product, comprising:
a non-transitory computer readable medium having program instructions stored thereon for a method of communicating a data link message, the method comprising:
transmitting a data link message from a sender to a receiver;
storing the trasmitted data link message;
starting a message timer when the data link message is transmitted;
determining whether a response to the data link message has been received;
determining whether the message timer has expired if the response has not been received;
notifying the sender when the message timer has expired and the response has not been received;
requesting input from the sender whether or not to retransmit the data link message;
if input is received from the sender to retransmit the data link message, displaying the data link message to the sender for review and edit; and
retransmitting the data link message from the sender to the receiver.

19. The computer program product of claim 18, wherein the program instructions stored on the non-transitory computer readable medium are implemented as part of communication protocols for a future air navigation controller pilot data link communication (CPDLC) system.

20. The computer program product of claim 18, wherein the program instructions stored on the non-transitory computer readable medium are implemented as part of communication protocols for an aeronautical telecommunication network CPDLC system.

* * * * *